US005679465A

United States Patent [19]

Bekele

[11] Patent Number: 5,679,465
[45] Date of Patent: Oct. 21, 1997

[54] VINYLIDENE CHLORIDE COMPOSITION AND FILM WITH HIGH THERMAL STABILITY

[75] Inventor: Solomon Bekele, Taylors, S.C.

[73] Assignee: W. R. Grace & Co.-Conn., Duncan, S.C.

[21] Appl. No.: 538,755

[22] Filed: Oct. 3, 1995

[51] Int. Cl.⁶ ............................................. B32B 27/08
[52] U.S. Cl. ........................... 428/474.4; 428/476.3; 428/480; 428/483; 428/500; 428/515; 428/518; 428/522; 525/239; 525/222; 525/228
[58] Field of Search ............................ 428/474.4, 476.3, 428/480, 483, 500, 515, 518, 522; 525/239, 222, 228

[56] References Cited

U.S. PATENT DOCUMENTS

| | | | |
|---|---|---|---|
| 3,136,657 | 6/1964 | Dixler et al. | 117/138 |
| 3,741,253 | 6/1973 | Brax et al. | 138/137 |
| 4,102,839 | 7/1978 | Crochemore et al. | 260/23 XA |
| 4,112,181 | 9/1978 | Baird, Jr. et al. | 428/336 |
| 4,320,175 | 3/1982 | Hisazumi et al. | 428/518 |
| 5,202,188 | 4/1993 | Bekele | 428/414 |
| 5,466,498 | 11/1995 | Forloni et al. | 428/36.7 |

FOREIGN PATENT DOCUMENTS 0530622   3/1993   European Pat. Off. .

*Primary Examiner*—Stevan A. Resan
*Attorney, Agent, or Firm*—David G. Burleson

[57] ABSTRACT

An extrudable vinylidene chloride composition is useful in packaging films where good thermal stability during processing, and oxygen barrier properties in the finished film are desirable. The composition, and film made therefrom, comprises 100 parts by weight of an extrudable vinylidene chloride copolymer; at least 0.1 parts by weight of an acid acceptor such as tetrasodium pyrophosphate; and between 1 and 10 parts by weight of a dienophile such as ethylene/butyl acrylate/maleic anhydride terpolymer. A polymeric lubricating agent can optionally be included in the composition and film. A film comprising a sealant layer; first and second intermediate layers comprising a material selected from polyamide, polyester, and ethylene vinyl alcohol copolymer; a barrier layer comprising vinylidene chloride copolymer; and an abuse layer is also disclosed.

20 Claims, No Drawings

VINYLIDENE CHLORIDE COMPOSITION AND FILM WITH HIGH THERMAL STABILITY

BACKGROUND OF THE INVENTION

The present invention relates to a composition and film made from vinylidene chloride polymers or copolymers; more particularly to a composition and film with enhanced thermal stability and oxygen barrier properties for monolayer and multilayer packaging films having a formulated layer of vinylidene chloride copolymer.

Thermoplastic packaging films made of vinylidene chloride copolymer, typically with methyl acrylate or vinyl chloride comonomers, and here referred to as "saran", have long been used to package food such as cheese, fresh meat, etc. Saran is a good barrier to the transmission of oxygen. Methods of producing a multilayer film having a layer of saran are disclosed in U.S. Pat. No 4,112,181 (Baird) and U.S. Pat No. 3,741,253 (Brax et al), both incorporated herein by reference.

Saran degrades during conventional extrusion operations, producing to some extent hydrogen chloride and conjugated polyenes.

The sequence includes a first reaction in which vinylidene chloride polymer, $(CH_2CCl_2)_n$, under heat and shear conditions (typical in extrusion operations) reacts to form $(CH=CCl)_n + nHCl$. This is of course undesirable, since HCl is corrosive, and accelerates the same reaction resulting in even more HCl generation.

A second reaction involves the reaction of $(CH=CCl)_n$ under continued heat and shear conditions, to produce conjugated polyene networks and additional HCl. This is also undesirable, because networks form gels, and gels lead to product defects in the form of pinholes.

Still further reaction results in the undesirable production of carbon.

It would be beneficial to provide a composition which prevents or retards the production of hydrogen chloride in the first reaction, and to retard the further degradation of the second reaction.

The present invention provides good thermal stability for saran formulations, and reduced degradation during extrusion.

The inventor has found that an acid acceptor such as tetrasodium pyrophosphate reacts with or accepts hydrogen chloride in the system, thereby slowing down further degradation of the vinylidene chloride polymer or copolymer. However, it has also been found that acid acceptors such as tetrasodium pyrophosphate do not disperse well in the vinylidene chloride matrix, and if used alone results in a non-uniform mixture. By also including a dienophile such as ethylene/butyl acrylate/maleic anhydride terpolymer, which acts both as a dienophile and a wetting agent, the acid acceptor is more uniformly dispersed in the vinylidene chloride matrix.

Methods for determining stability are well known, e.g. as described in U.S. Pat. No. 5,202,188 incorporated herein by reference.

SUMMARY OF THE INVENTION

In a first aspect of the invention, a composition comprises 100 parts by weight of an extrudable vinylidene chloride polymer or copolymer; at least 0.1 parts by weight of an acid acceptor; and between 1 and 10 parts by weight of a dienophile.

In a second aspect of the invention, a thermoplastic film comprises a barrier layer comprising 100 parts by weight of an extrudable vinylidene chloride polymer or copolymer; at least 0.1 parts by weight of an acid acceptor; and between 1 and 10 parts by weight of a dienophile.

In a third aspect, a package comprises a food article; and a bag containing the food article, the bag made from a thermoplastic film comprising a barrier layer comprising 100 parts by weight of an extrudable vinylidene chloride copolymer; at least 0.1 parts by weight of an acid acceptor; and between 1 and 10 parts by weight of a dienophile.

DEFINITIONS

"Acid acceptor" herein means a compound that reacts with an acid such as hydrogen chloride and renders it non-reactive for further dehydrochlorination.

"Dienophile" herein means a compound that is capable of reacting with conjugated double bonds and making them nonparticipative in degradation color development associated with the degradation of vinylidene chloride polymer and copolymer.

DESCRIPTION OF THE PREFERRED EMBODIMENTS

The present inventive composition preferably comprises 100 parts by weight of an extrudable vinylidene chloride copolymer; between 1 and 10 parts by weight of an acid acceptor; and between 1 and 10 parts by weight of an dienophile. The composition can thus comprise 1, 2, 3, 4, 5, 6, 7, 8, 9, or 10 parts by weight of each of the acid acceptor and dienophile.

Optionally, the present composition further comprises between 1 and 5 parts by weight of a polymeric lubricating agent. The composition can thus comprise 1, 2, 3, 4, or 5 parts by weight of polymeric lubricating agent.

The acid acceptor can be any material as defined, and is preferably a soap of fatty acid, such as calcium ricinoleate, or a salt of weak inorganic acid, such as tetrasodium pyrophosphate.

The dienophile can be any material as defined, and is preferably a copolymer having an anhydride moiety. More preferred is a terpolymer having olefinic, acrylic, and anhydride comonomers, or a grafted copolymer of maleic anhydride. Most preferred is ethylene/alkyl acrylate/maleic anhydride terpolymer, such as ethylene/butyl acrylate/maleic anhydride terpolymer.

The polymeric lubricating agent can be any polymeric material which reduces the tendency of the composition to stick to metal parts during extrusion and processing, and is preferably a terpolymer having an acrylate comonomer, or calcium ricinoleate. The terpolymer preferably comprises methyl methacrylate/butyl acrylate/styrene terpolymer; methyl methacrylate/butyl acrylate/butyl methacrylate terpolymer; or blends thereof.

The composition can be made into monolayer or multilayer film, oriented or unoriented, cross-linked or not cross-linked, shrinkable or not shrinkable, by means well known in the art.

In a preferred embodiment, a film comprises a four layer film structure: sealant layer/core layer/barrier layer/abuse layer where:

sealant layer=90% ethylene vinyl acetate copolymer (EVA) (6% vinyl acetate)+10% linear low density polyethylene (LLDPE) which is an ethylene/octene copolymer (6.5% octene);

core layer=ethylene vinyl acetate copolymer (EVA) (15% vinyl acetate);

barrier layer=(as defined in the Tables); and abuse layer=92.5% ethylene vinyl acetate copolymer (EVA) (9% vinyl acetate) and 7.5% linear low density polyethylene (LLDPE) which is an ethylene/octene copolymer (6.5% octene).

The sealant and abuse layers can comprise any suitable polymeric material, but preferably comprise an ethylene alpha olefin copolymer, an ethylene unsaturated ester copolymer, an ethylene acid copolymer, other polyolefins, or any combination or blend thereof. The core layer, which is optional, can also comprise any of these materials. Ethylene alpha olefin copolymers are preferably copolymers of ethylene with one or more comonomers selected from $C_3$ to $C_{10}$ alpha olefins. Both heterogeneous and homogeneous materials can be used. Examples of heterogeneous materials include LLDPE (linear low density polyethylene), VLDPE (very low density polyethylene), ULDPE (ultra low density polyethylene), and the like. Homogeneous materials can include metallocene catalyzed polymers (MCP) such as those available from Exxon under the EXACT trademark, and available from Dow under the AFFINITY trademark.

Ethylene unsaturated ester copolymer refers to materials such as ethylene vinyl acetate copolymer (EVA), ethylene alkyl acrylate copolymers such as ethylene ethyl acrylate copolymer (EEA), ethylene methyl acrylate copolymer (EMA), and ethylene n-butyl acrylate copolymer (EnBA). It also refers to ethylene methyl methacrylate copolymer (EMMA).

Ethylene acid copolymer refers to materials such as ethylene acrylic acid copolymer (EAA), and ethylene methacrylic acid copolymer (EMAA). Metal salt neutralized or partially neutralized versions of these materials, such as ionomer, are also included herein.

In an alternative embodiment, a film comprises a six layer film structure: sealant layer/tie/intermediate layer/barrier layer/intermediate layer/abuse layer where the sealant, barrier, and abuse layers are as described above for the four layer film, and:

tie layer=polymeric adhesive such as acid or acid anhydride-grafted polyolefinic adhesives, such as those sold under the trademarks Bynel, Plexar, Admer, and the like; and intermediate layer=polyamide or copolyamide, polyester or copolyester, or ethylene vinyl alcohol copolymer, or blends of any of these materials.

In another alternative embodiment, a film comprises a five layer film structure: sealant layer/intermediate layer/barrier layer/intermediate layer/abuse layer, where the sealant, intermediate, barrier, and abuse layers are as described above for the six layer film.

In the five and six layer embodiments, and for similar films with additional layers, the barrier layer can optionally comprise a vinylidene chloride copolymer without the acid acceptor and/or dienophile described above.

EXAMPLES

Table 1 identifies the compositions used in the examples.

Four compositions of the present invention, as well as five comparative compositions, were tested for $O_2$ transmission rates. The results are shown in Table 2. Oxygen transmission were measured by ASTM 3985 using Mocon equipment.

Table 3 shows the thermal stability (shown as cross-linking time in minutes) of two additional examples, compared with two additional comparative examples.

All examples and comparative examples had the overall film structure EVA+LLDPE/EVA/Barrier/EVA+LLDPE as identified above.

TABLE 1

| MATERIAL | TRADENAME | SOURCE |
|---|---|---|
| $VDC_1$ | MA134 | DOW |
| $VDC_2$ | XU 32024.10 | DOW |
| $AA_1$ | tetrasodium pyrophosphate | Monsanto |
| $DP_1$ | Lotader P3-3200 | Elf Atochem |
| $PLA_1$ | Metablen L1000 | ATOCHEM |
| $P_1$ | Plas-Chek 775 | FERRO |
| $P_2$ | EPON 828 | SHELL | where:
$VDC_1$ = vinylidene chloride/methyl acrylate copolymer (8.5 mole % methyl acrylate);
$VDC_2$ = vinylidene chloride/methyl acrylate copolymer (6.0 mole % methyl acrylate);
$AA_1$ = acid acceptor = tetrasodium pyrophosphate;
$DP_1$ = dienophile = ethylene/butyl acrylate/maleic anhydride terpolymer;
$PLA_1$ = polymeric lubricating agent = methyl methacrylate/butyl acrylate/butyl methacrylate terpolymer;
$P_1$ = epoxidized soybean oil; and
$P_2$ = diglycidyl ether of bisphenol-A.

In the tables, "phr" means pounds per hundred (weight units) of material. For example, in comparative example 1, the equivalent of 100 pounds of saran was blended with 2 pounds of $P_1$, and 2 pounds of $PLA_1$. An equivalent to phr is "parts by weight".

TABLE 2

| EXAMPLE | COMPOSITION (phr) | OTR (cc/mil/day · m² · atm.) |
|---|---|---|
| Comparative 1 | 100 $VDC_1$ + 2 $P_1$ + 2 $PLA_1$ | 3.2 |
| Comparative 2 | 100 $VDC_1$ + 4 $P_1$ + 2 $PLA_1$ | 6.0 |
| Comparative 3 | 100 $VDC_1$ + 2 $P_2$ + 2 $PLA_1$ | 2.8 |
| Comparative 4 | 100 $VDC_1$ + 4 $P_2$ + 2 $PLA_1$ | 2.8 |
| Comparative 5 | 100 $VDC_1$ + 2 $P_1$ 2 $PLA_1$ | 3.2 |
| 1 | 100 $VDC_1$ + 1 $AA_1$ + 4 $DP_1$ + 2 $PLA_1$ | 2.2 |
| 2 | 100 $VDC_1$ + 1 $AA_1$ + 2 $DP_1$ + 2 $PLA_1$ | 2.0 |
| 3 | 100 $VDC_1$ + 1 $AA_1$ + 2 $DP_1$ | 1.4 |
| 4 | 100 $VDC_2$ + 1 $AA_1$ + 2 $DP_1$ | 1.0 |

Table 3 contains thermal stability data. Thermal stability was measured by taking the blend components of each example, and blending them in a torque rheometer at a mixing temperature of 335° F. and a rotational speed of 63 rpm (for comparative example 6, and example 5) and at a mixing temperature of 365° F. and a rotational speed of 63 rpm (for comparative example 7, and example 6). Thermal stability is monitored as a function of mixing time. Changes in stability are indicated by changes in mixing torque. The crosslinking time corresponds to the maximum torque reached during the test. Crosslinking is related to molecular weight, which increases as a result of the formation of polymeric networks (an undesirable degradation effect).

Thus, the time in minutes until crosslinking occurred is considered a measure of the thermal stability of the blended composition. Those compositions which included both an acid acceptor (tetrasodium pyrophosphate) and a dienophile (ethylene/butyl acrylate/maleic anhydride terpolymer) showed significant improvements in thermal stability as measured by time to crosslink.

TABLE 3

| EXAMPLE | COMPOSITION (phr) | CROSSLINKING TIME (minutes) |
|---|---|---|
| Comparative 6 @ 335° F. | 100 VDC$_1$ + 1 AA$_1$ | 17 |
| 5 @ 335° F. | 100 VDC$_1$ + 1 AA$_1$ + 2 DP$_1$ | 31 |
| Comparative 7 @ 365° F. | 100 VDC$_1$ + 1 AA$_1$ | 9 |
| 6 @ 365° F. | 100 VDC$_1$ + 1 AA$_1$ + 2 DP$_1$ | 24 |

The examples were made by a tubular extrusion coating process, well known in the art. However, other processes, such as blown film, flat cast extrusion or coextrusion, lamination, extrusion coating, extrusion lamination and the like can be employed. These alternative processes are well known in the art.

The examples were made by irradiating a substrate (sealant and core layer) prior to extrusion coating of the barrier and abuse layers, and prior to orientation. Alternatively, films of the invention can be crosslinked by conventional means such as electronic or chemical crosslinking; post-irradiated, i.e. irradiated after orientation; or made without crosslinking, or without orientation.

Orientation is accomplished by conventional means such as blown bubble or tenterframe. Orientation ratios can be at any suitable range or ratio, including 1:1 to 6:1 in either or both of the machine and transverse direction.

Those skilled in the art will understand that modifications to the present invention can be made after review of the disclosure. Such modifications are deemed to be within the scope of the invention as claimed.

For example, although four, five, and six layer embodiments are specifically disclosed, those in the art will readily understand that one or more layers can be made into a film having the benefits described.

"Copolymer" as used herein includes polymers with at least two dissimilar comonomers, so that terpolymers, etc. are also included.

What is claimed is:

1. A thermoplastic film comprising a barrier layer derived from a composition comprising:
    a) an extrudable vinylidene chloride polymer or copolymer;
    b) per 100 parts by weight of (a), at least 0.1 parts by weight of an acid acceptor selected from the group consisting of a soap of a fatty acid and a salt of weak inorganic acid; and
    c) per 100 parts by weight of (a), between 1 and 10 parts by weight of a dienophile copolymer comprising an anhydride moiety.

2. The film of claim 1 wherein said composition comprises between 1 and 10 parts by weight of said acid acceptor.

3. The film of claim 1 wherein said composition comprises between 1 and 5 parts by weight of the acid acceptor.

4. The film of claim 1 wherein said composition further comprises, per 100 parts by weight of (a), between 1 and 5 parts by weight of a polymeric lubricating agent.

5. The film of claim 4 wherein said polymeric lubricating agent comprises a terpolymer having mer units derived from an acrylate monomer.

6. The film of claim 1 wherein said soap of a fatty acid comprises calcium ricinoleate.

7. The film of claim 1 wherein said salt of a weak inorganic acid comprises tetrasodium pyrophosphate.

8. The film of claim 1 wherein said copolymer comprising an anhydride moiety comprises a terpolymer having mer units derived from olefinic, acrylic, and anhydride comonomers or a grafted copolymer of maleic anhydride.

9. The film of claim 8 wherein said terpolymer comprises an ethylene/alkyl acrylate/maleic anhydride terpolymer.

10. The film of claim 1 further comprising a sealant layer, a core layer, and an abuse layer.

11. The film of claim 1 wherein said composition comprises between 1 and 5 parts of said dienophile.

12. A film comprising:
    a) a sealant layer;
    b) a first intermediate layer comprising a material selected from the group consisting of polyamide, polyester, and ethylene vinyl alcohol copolymer;
    c) a barrier layer comprising vinylidene chloride copolymer, said barrier layer being derived from a composition comprising:
        i) an extrudable vinylidene chloride polymer or copolymer;
        ii) per 100 parts by weight of (i), at least 0.1 parts by weight of an acid acceptor selected from the group consisting of a soap of a fatty acid and a salt of weak inorganic acid; and
        iii) per 100 parts by weight of (i), between 1 and 10 parts by weight of a dienophile copolymer comprising an anhydride moiety;
    d) a second intermediate layer comprising a material selected from the group consisting of polyamide, polyester, and ethylene vinyl alcohol copolymer; and
    e) an abuse layer.

13. The film of claim 12 further comprising a polymeric adhesive layer disposed between said first intermediate layer and said sealant layer.

14. The film of claim 12 wherein said composition comprises between 1 and 10 parts by weight of said acid acceptor.

15. The film of claim 12 wherein said composition further comprises, per 100 parts by weight of (c)(i), between 1 and 5 parts by weight of a polymeric lubricating agent.

16. The film of claim 12 wherein said copolymer comprising an anhydride moiety comprises a terpolymer having mer units derived from olefinic, acrylic, and anhydride comonomers or a grafted copolymer of maleic anhydride.

17. The film of claim 16 wherein said terpolymer comprises an ethylene/alkyl acrylate/maleic anhydride terpolymer.

18. A package comprising:
    a) a food article; and
    b) a bag containing said food article, said bag being made from a thermoplastic film comprising a barrier layer comprising:

i) an extrudable vinylidene chloride polymer or copolymer;

ii) per 100 parts by weight of (i), at least 0.1 parts by weight of an acid acceptor selected from the group consisting of a soap of a fatty acid and a salt of weak inorganic acid; and iii) per 100 parts by weight of (i), between 1 and 10 parts by weight of a dienophile copolymer comprising an anhydride moiety.

19. The package of claim 18 wherein the food article is a member selected from the group consisting of fresh red meat, fresh pork, processed meat, and smoked meat.

20. The package of claim 18 wherein said copolymer comprising an anhydride moiety comprises a terpolymer having mer units derived from olefinic, acrylic, and anhydride comonomers or a grafted copolymer of maleic anhydride.

* * * * *